This invention relates to a novel vehicle and in one aspect to a novel running gear or an attachment to convert an otherwise conventional motor bike or cycle into a useful vehicle for travel over snow or over soft but fairly firm supporting surfaces, such as sand.

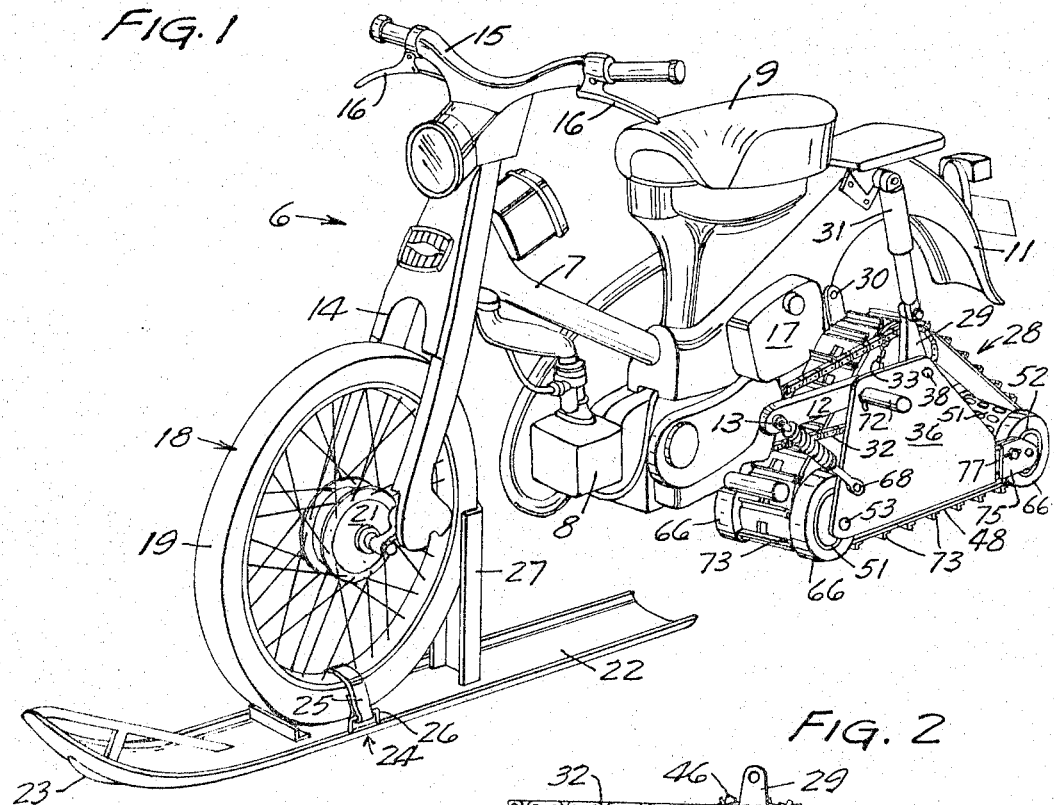
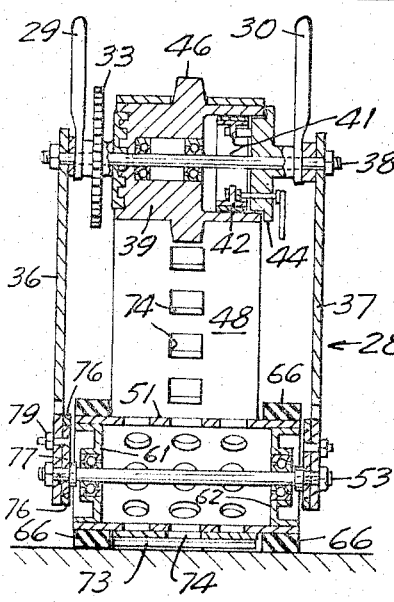
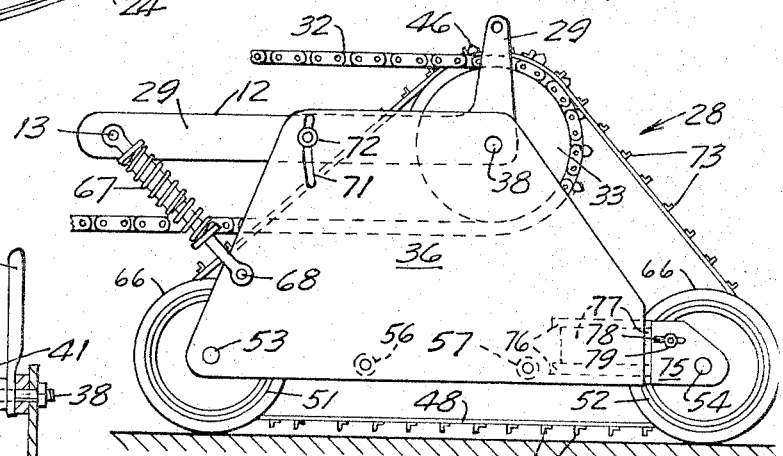
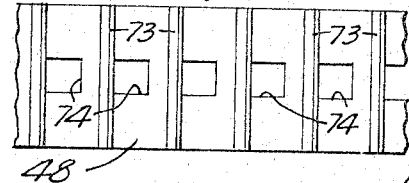
INVENTOR
WALTER H. PEDERSON
BY
John C. Barnes
ATTORNEY 3,336,994
ENDLESS CRAWLER ATTACHMENT FOR CYCLES
Walter H. Pederson, Rte. 1, St. Cloud, Minn. 56301
Filed Dec. 3, 1964, Ser. No. 415,678
6 Claims. (Cl. 180—5)

The main objective of the present invention is to provide an attachment whereby a motor bike or cycle is readily converted into a vehicle suitable for travel over snow with the ease presently attributed only to specially designed snow vehicles, although it is to be understood that such attachment allows the vehicle to travel over firm terrain as well as the soft terrain.

It is another object of the present invention to provide a fairly novel and inexpensive device and one which may be easily attached to the cycle to be driven by the power source thereof for propelling said cycle.

A further object of the present invention is to provide an attachment having an endless crawler type tread assembly which will sufficiently support the weight of the cycle and operator and carry the same over the soft terrain.

The present invention affords an attachment for converting a cycle into a novel snow vehicle having just two running gears which will provide transportation for sport and travel during the winter without the necessity of owning a separate vehicle for such travel.

The above objects together with other advantages will become apparent after reading the following detailed description wherein reference is made to the accompanying drawings forming a part thereof, and in which:

FIGURE 1 is a perspective view of a motor bike or cycle showing the device of the present invention mounted thereon;

FIGURE 2 is a side elevation view of the device made in accordance with the present invention and showing the same in relation to several parts of the cycle;

FIGURE 3 is a sectional view of the device shown in FIGURE 2; and

FIGURE 4 is a detailed view of the endless tread assembly of the device.

Referring now to the drawing there is illustrated in FIGURE 1 a conventional motor bike or cycle 6, hereinafter referred to as cycle, converted into a novel snow vehicle. The cycle 6 includes a main frame 7 which supports an internal combustion engine 8, a seat 9, rear fender assembly 11, and a rear fork 12 pivotally connected to said main frame by a transverse shaft 13. A front spring fork 14 is pivotally connected to the main frame 7 for movement about a generally vertical axis. The front spring fork includes a handle bar 15 and handle bar controls 16. These handle bar controls include a throttle and brake member. A gasoline tank 17 is also mounted on the main frame 7 to hold fuel for the engine 8.

The front running gear includes the conventional front wheel 18 having a pneumatic tire 19 mounted on the felly and a hub 21 journaled on a shaft supported in the front fork 14 and a ski 22 attached to the wheel 18. As illustrated, the ski 22 has a keel 23 and is suitably attached to the wheel 18 by a clamp 24. The ski 22 is easily manipulated upon movement of the front fork affording good control for the cycle when the same is driven over the snow. The clamp 24 includes a strap 25 fixed to brackets 26 (only one of which is shown) secured to opposite edges of the ski 22. An additional bracket 27 secured to the ski extends upwardly along the rear of the tire 19 to stabilize the ski 22.

The rear running gear is made up of several parts to afford an attachment for conventional cycles and said attachment is generally designated 28. FIGURE 1 shows the attachment 28 on the cycle 6 in place of the conventional rear tire which is normally placed between two rearwardly extending members 29 and 30 (FIGURE 3) which are the bifurcations of the rear fork 12. The fork members 29 and 30 include upwardly projecting end portions to which are joined dash-pot type shock absorbers 31 (only one of which is shown) which restrict rotational movement of said fork members about the axis of shaft 13. A link drive chain 32 extends from a driven sprocket (not shown) on the engine 8 and drives a sprocket wheel 33 mounted between the rear portions of members 29 and 30 of the rear fork 12. The rear tire of the cycle is normally driven from a sprocket wheel such as the sprocket wheel 33.

The attachment 28 comprises a pair of transversely spaced side frame members 36 and 37, a shaft 38, a drive hub 39, an endless flexible drive belt or chain 48 and a pair of idler and support drums 51 and 52. The frame members 36 and 37 are trapezoidal-shaped and are pivotally secured to the rear extremities of the fork members 29 and 30 by means of the transversed shaft 38 which also rotatably supports the sprocket wheel 33. The hub 39 is bearinged on the shaft 38 intermediate the fork member 30 and the sprocket wheel 33. Suitable spacer means or washers are shown in FIGURE 3 positioned on the shaft 38 between the frame members and the fork members and between the sprocket wheel and fork member. A driving connection is provided between the sprocket wheel 33 and the hub 39, and as illustrated, comprises an interlocking tooth clutch. Braking means for the hub 39 include internally expanding brake shoes 41 and 42 which are supported by a stationary backing plate 44 and expand against the inner surface of said hub.

A plurality of circumferentially spaced sprockets 46 which are generally pyramidal in shape are provided on the outer surface of hub 39. The sprockets 46 provide a drive transmitting connection with the endless belt 48. The idler drums 51 and 52 are generally cylindrical and are mounted adjacent the lower edge of the frame members 36 and 37 at the forward and trailing ends thereof and project beyond the outline of said frame members. The endless belt 48 is entrained around the drums 51 and 52 and the hub 39. The drums 51 and 52 are rotatably mounted on transversely extending shafts 53 and 54. The shafts 53 and 54 together with the shaft 38 thus form a generally triangular relationship with respect to each of said side frame members 36 and 37. Suitable spacer rods 56 and 57 extend transversely between the lower portions of the side frames 36 and 37 and help to maintain said side frames in a predetermined transverse spaced relation.

The drums 51 and 52 are identical and the drum 51 is shown in greater detail in FIGURE 3. Drum 51 is formed with a pair of hub members 61 and 62, one positioned adjacent each end of the drum. The hubs 61 and 62 are formed with suitable bushings or bearings to rotatably journal the drum on the shaft 53. The shaft 53 extends between the frame members 36 and 37 and is provided adjacent said frame members with suitable lock nuts aiding to retain the side frame members 36 and 37 in a predetermined transversely spaced relationship and to center the drum 51. On the outer peripheral surface of the drum 51 and adjacent each end is a solid tire 66 formed by covering the outer periphery of the drum 51 adjacent each said end with suitable friction material such as rubber. These coverings of friction material provide a predetermined exposed central surface on the drum 51 around which the endless belt is guided. The thickness of each covering for the tires 66 is such that when driving over hard, flat surfaces the tires will engage such surface rather than the belt assembly 48. The generally cylindrical drums 51 and 52 are formed with a plurality of perforations as a means for reducing the weight of the drum.

A dash-pot shock absorber 67 is mounted between each frame member 36 and 37 and the shaft 13 supporting the rear fork 12. The shock absorbers 67 (only one of which is shown in the drawing) are mounted to the side frame members 36 and 37 by means of suitable attaching bolts 68 extending outwardly from said members in a position above the drum 51 as shown most clearly in FIGURE 2. The side frame members 36 and 37 are also supported from the fork members 29 and 30 by means of arcuate slots 71 (only one of which is shown) and the rear foot rests 72. The slots 71 have the axis of the shaft 38 for their center. The slots 71 and foot rests 72 help stabilize the frame members 29 and 30 in relation to the fork members but also allow pivotal movement of the attachment 28 about the shaft 38 and about the shaft 13. It being understood that the pivotal movement of the attachment about the shaft 38 is restricted by the shock absorbers 67 and that the pivotal movement of the attachment about the shaft 13 is restricted by the shock absorbers 31.

The endless belt 48 includes a plurality of transverse gripping cleats or bars 73 which are formed of angle iron and are suitably riveted to the belt 48. The belt 48 also includes a plurality of square openings 74 to provide a driving connection with the sprockets 46. The openings formed in the belt have one edge terminating in line with the backside of the transverse angle bars 73 (see FIG. 4). The belt is preferably about 5 inches in transverse width and the openings are substantially 1 inch square and the angle bars forming the cleats are one quarter inch angles. The total thickness of the belt 48 is preferably less than the height of the friction coatings forming tires 66.

The drum 52 is mounted for adjustment with respect to the drum 51 to provide a stretch for the belt between the axis of said drums of between 20 and 26 inches to provide a belt supporting area on the soft terrain of between 100 and 130 square inches.

The adjustment of the drum 52 is provided by adjustment of the rear portion 75 of the side frames 36 and 37 with respect to the remainder of said side frame members. This adjustment is provided by interfitting slide members 76 and 77 secured to the side frames and rear portion 75 thereof respectively. The rear portions 75 are provided with slotted openings 78 to receive bolts 79 carried by slide members 76. The bolts 79 clamp the rear portions 75 in predetermined fixed position with respect to the remainder of the side frame members 36 and 37.

The attachment is placed on a cycle 6 by removing the conventional rear axle shaft and rear wheel, including hub, wheel and tire, from the cycle. The attachment 28 is then positioned to receive the fork members 29 and 30 between the side frame mebers 36 and 37. The hub 39 and belt 48 are raised between the fork members 29 and 30. The shaft 38 is inserted (the shaft 38 having a length greater than the conventional shaft to fit the frames 36 and 37) through the side frames to journal the hub 39, sprocket wheel 33 and mount the same on the ends of fork members 29 and 30. The brake actuator (not shown) is then connected to the brake actuator supported by the backing plate 44. The rear foot rests 72 are fastened to the fork members through slots 71. The shock absorbers 67 are then attached to the ends of shaft 13. This attachment thus provides for the easy conversion of a bike or cycle to a novel snow vehicle having two running gears.

Having thus disclosed the preferred embodiment of my invention it will be appreciated that this disclosure is not for the purpose of defining the limits of the invention but is merely illustrative, and that all such changes or modifications thereof that will become obvious to one having ordinary skill in the art are contemplated as may come within the scope of the appended claims.

What I claim as my invention is:

1. An attachment device to be substituted for the rear wheel of a two wheel vehicle adapting the same for travel over soft terrain and comprising:

a pair of transversely spaced generally trapezoidal shaped side frame members, a pair of generally cylindrical drums mounted for rotation and positioned between the frame members in spaced relation along the lower portion of said frame members with the periphery of said drums extending below said frame, said drums being provided on their outer surface and adjacent each end with a coating of friction material, a hub having sprockets on its outer periphery and positioned in vertically spaced relation with said drums and journaled on a shaft extending between said frame members, and an endless flexible belt entrained about said drums between the coatings at each end thereof and about said hub, said belt having a width not greater than the length of the exposed drum surface between said coatings, and said belt being formed with means cooperating with said sprockets to afford a driving connection between the hub and said belt.

2. An attachment device to be substituted for the rear wheel of a two wheel vehicle adapting the same for travel over soft terrain and comprising:

a pair of transversely spaced side frame members, a pair of generally cylindrical drums mounted for rotation and positioned between the frame members in spaced relation along the lower portions of said frame members with the periphery of said drums extending below said frame, each of said drums being provided on their outer surface and adjacent each end with a coating of friction material having a predetermined thickness, a hub having sprockets on its outer periphery and positioned in vertically spaced relation to said drums, a shaft extending between said frame member to rotatably support said hub and to pivotally support said frame members to a said vehicle, an endless flexible belt entrained about said drums between the coatings at each end thereof and about said hub, said belt having a total thickness less than the predetermined thickness of said coatings and a width not greater than the length of the exposed drum surface between said coatings, and said belt being formed with means cooperating with said sprockets to afford a driving connection between the hub and said belt, and means connected to each said frame member and adapted to be connected to a said vehicle for resisting rotation of said frame members relative to said shaft.

3. A snow vehicle having one forward and one rear running gear and comprising a main frame, a forward fork rotatably supporting between the bifurcations a wheel and said fork being mounted for movement about a generally vertical axis to said main frame and including handle bars affording a steering gear for said vehicle, and a power source on said main frame including a drive chain to propel said vehicle, said rear running gear being pivotally mounted relative to the main frame and comprising:

transversely spaced side frame members, three parallel shafts mounted on and extending transversely between said frame members with the axes of said shafts being positioned to define the apices of a triangle, a pair of generally cylindrical drums positioned in spaced relation between the lower portions of said frame members and rotatably mounted on two of said shafts with the peripheral surface of said drums extending below said frames, each of said drums having friction material encircling the outer peripheral surface of said drums adjacent each end, a sprocket wheel mounted on the third of said shafts which is vertically spaced above two of said shafts and having said drive chain extending thereover, a hub including a drive transmitting connection with said sprocket wheel and having sprockets on its outer peripheral surface, and an endless flexible belt entrained about said drums and engaging the central portions of said drums between the friction material and around said hub, said belt being formed to have a driving connection with said sprockets.

4. The vehicle according to claim 3 wherein a ski is clamped intermediate its ends to said wheel.

5. The vehicle according to claim 3 wherein said belt has a width of 5 inches and the drums are spaced longitudinally of said vehicle a distance to afford a belt traction surface of between 100 and 130 square inches.

6. An endless track attachment device to be substituted for the rear wheel of a two wheel vehicle adapting the same for travel over soft terrain and comprising:

a pair of transversely spaced parallel side frame members each having a trailing and leading end, a pair of generally cylindrical drums mounted between said frame members, one adjacent said trailing end and one adjacent said leading end, each of said drums being provided on their outer peripheral surface with axially spaced coatings of friction material having a predetermined thickness, an endless flexible belt having transverse cleats directed around the surface of said drums between the coatings, said belt having a thickness not greater than the thickness of said coatings, drive means for driving said belt including a sprocket wheel around which a drive chain may be directed, and means for mounting said frame members for restrictive vertical pivotal movement of the leading end of said frame members with respect to a said vehicle.

References Cited

UNITED STATES PATENTS

| | | | |
|---|---|---|---|
| 654,291 | 7/1900 | Stith | 180—9.24 |
| 1,254,824 | 1/1918 | Marcinko | 180—5 |
| 2,284,075 | 5/1942 | Tucker et al. | 180—5 |
| 2,712,357 | 7/1955 | Fulton et al. | 180—6.28 |
| 3,039,828 | 6/1962 | Johnston | 305—25 |
| 3,077,238 | 2/1963 | Nelson | 180—5 |
| 3,082,044 | 3/1963 | Klemm | 305—12 |
| 3,101,805 | 8/1963 | Tritle | 180—9.24 |

LEO FRIAGLIA, *Primary Examiner.*